United States Patent [19]
Eitreim

[11] 3,802,717
[45] Apr. 9, 1974

[54] DOLLY CONSTRUCTION

[75] Inventor: Jacob O. Eitreim, Garretson, S. Dak.

[73] Assignee: Sioux Corporation, Beresford, S. Dak.

[22] Filed: Oct. 19, 1972

[21] Appl. No.: 299,152

[52] U.S. Cl. ............ 280/79.1, 248/DIG. 7, 248/154
[51] Int. Cl. ............................................. B62d 53/06
[58] Field of Search ............. 280/79.1, 79.2, 179 R; 248/DIG. 7, 154, 149

[56] References Cited
UNITED STATES PATENTS
2,930,561   3/1960   Bittle ........................ 248/DIG. 7
3,239,175   3/1966   Seibel ............................... 248/154
2,112,155   3/1938   Haney ........................... 248/DIG. 7
2,917,769   12/1959  Kasper ............................ 280/79.1

*Primary Examiner*—Robert R. Song
*Attorney, Agent, or Firm*—Merchant, Gould, Smith & Edell

[57] ABSTRACT

A dolly for releasably supporting pails or other containers. A base is supported by rolling elements, and a plurality of brackets are mounted on the base for movements generally toward and away from the center of the base. An elongated flexible tie member is supported by at least some of the brackets and encompasses a pail, drum or other article on the base to hold the article in place.

2 Claims, 2 Drawing Figures

PATENTED APR 9 1974  3,802,717

DOLLY CONSTRUCTION

Background of the Invention

Dollies used for supporting heavy objects for free movement over floor or ground are known. Usually, these comprise a flat frame having rollers or wheels thereunder and support articles set on the frame, friction between the article and the frame being relied upon to prevent movement of the article relative to the frame. Some dollies or trucks are known to have upwardly projecting stakes for limiting movement of the load on the truck or dolly.

Summary of the Invention

An important object of this invention is the provision of a dolly having adjustable means for securing articles of various shapes and sizes thereon with a minimum of effort and in a minimum of time. Another object of this invention is the provision of a dolly having a high degree of stability, and which is light in weight and easily moved in various directions.

To the above ends, I provide a dolly including a base comprising a pair of generally horizontal arms disposed at right angles to each other and secured together generally centrally between their opposite ends. Caster wheels are mounted on the arms adjacent their opposite ends to provide for free rolling movement of the dolly over the floor or ground. Brackets are slidably mounted on the arms for movements between the caster wheels and the center of the dolly, the brackets supporting an elongated flexible tie member that is adapted to encompass an article on the base. The tie member may be tightened about the article and, with the brackets, securely hold the article, such as a pail or drum, centrally located on the base and against lateral movement relative to the base.

Detailed Description of the Preferred Embodiment

Figure 1:
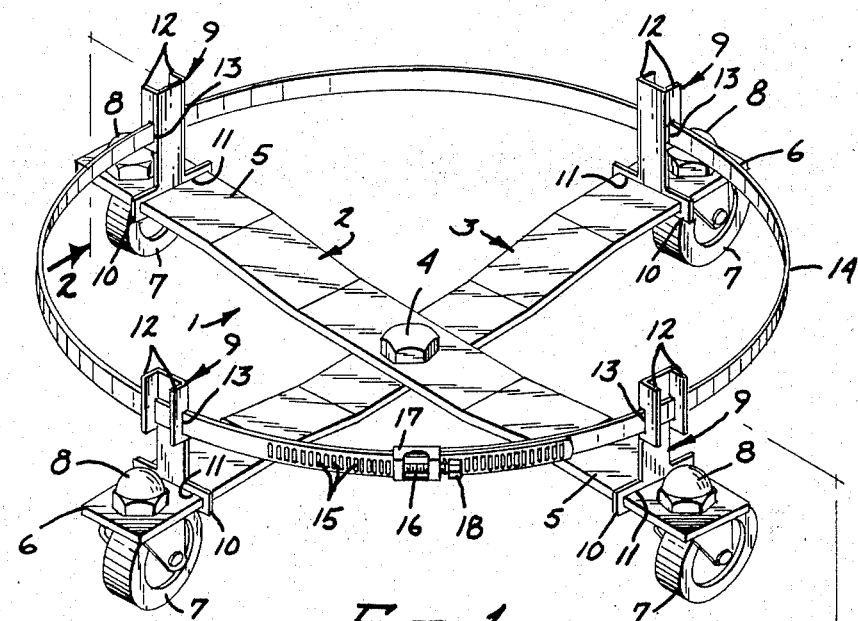
FIG. 1 is a view in perspective of a dolly produced in accordance with this invention.

The dolly of this invention involves a generally horizontally disposed base, indicated generally at 1, the base 1 including a pair of elongated rigid bars 2 and 3 which, in use, are disposed at generally right angles to each other, and which are provided with suitable openings centrally between their opposite ends for reception of a nut-equipped machine screw or bolt 4 for releasably holding the bars 2 and 3 in their angularly displaced positions shown. At their longitudinally central portions, the bars 2 and 3 are vertically downwardly offset from their opposite end portions to provide clearance between the head of the screw or bolt 4 and an overlying article to be carried by the dolly. The bars 2 and 3 provide respective radially outwardly projecting arms 5 and 6 to the outer ends of which are secured rolling members in the nature of caster wheels 7, these being secured to their respective arms 5 and 6 by the usual means including anchoring nuts 8.

Each of the arms 5 and 6 has mounted thereon a different one of a plurality of brackets 9 having lower ends 10 that define generally rectangular openings 11 through which the arms 5 and 6 loosely extend to permit sliding movements of the brackets 9 longitudinally of their respective arms 5 and 6, or generally radially with respect to the base 1. As shown, the brackets 9 project upwardly from their respective arms 5 and 6 and, at their upper ends, are provided with out-turned flanges 12 having aligned generally rectangular openings 13 therethrough. An elongated flexible tie member in the nature of a metallic strap or band 14 extends through the openings 13 in the several brackets 9 above the level of the arms 5 and 6. One end portion of the strap or band 14 is formed to provide a plurality of longitudinally spaced transverse grooves or threads 15 for engagement with a worm or screw 16 journaled in a housing 17 mounted on the opposite end of the strap or band 14. As shown, the worm or screw 16 projects outwardly of the housing 17 and is provided with a head 18 by means of which the worm or screw 16 may be rotated. The grooved or slotted end portion of the strap or band 14 extends through a suitable opening in the housing 17 for screw-threaded engagement with the worm or screw 16. Rotation of the worm 16 effectively lengthens or shortens the strap or band 14. This specific structure is well known, and is commonly used in connection with hose clamps and the like.

In storage or shipment, the nut-equipped central screw 4 is loosened, and the bars 2 and 3 are swung relative to each other toward a parallel relationship, or as close to such relationship as the shape of the bars 2 and 3 permits. When thus disposed relative to each other, the entire assembly takes up a minimum of space for storage or shipment.

When the dolly is in use, the bars 2 and 3 are preferably disposed at right angles to each other, and the desired article, such as a cylindrical container, indicated at 19, is placed on the radial arms 5 and 6, generally centrally of the base 1. The brackets 9 are then moved radially inwardly on their respective arms 5 and 6 until they engage the outer surface of the container 19, after which the screw or worm 16 is manipulated to tighten the band 14 so that the same snugly engages the outer surface of the container 19 between the brackets 9. When the container 19 is thus secured on the dolly, the container may be filled with material and easily moved from place to place as desired.

Figure 2:
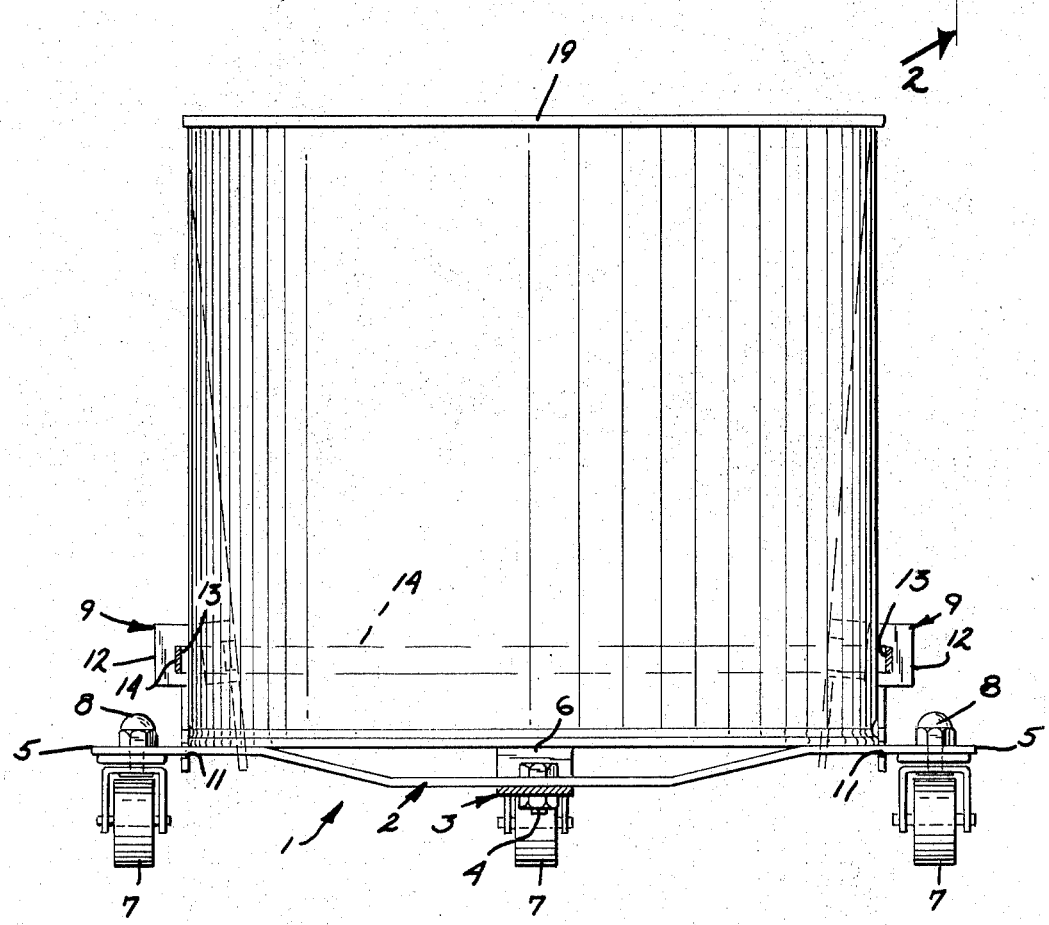
FIG. 2 is a transverse section taken substantially on the line 2—2 of FIG. 1.

With reference to FIG. 2, it will be seen that the openings 11 are of a size to permit the brackets 9 to be easily moved on their respective arms 5 and 6, and to be tilted, as shown by dotted lines in FIG. 2, to accommodate articles such as pails having tapered side walls. Further, the flexibility of the band or strap 14 permits non-circular or rectangular articles to be firmly secured on the dolly.

While I have shown and described a commercial embodiment of my dolly construction, it will be understood that the same is capable of modification without departure from the spirit and scope of the invention, as defined in the claims.

What is claimed is:

1. Dolly construction comprising:
   a. a generally horizontally disposed base including a plurality of radial arms having circumferentially spaced outer ends;
   b. a plurality of floor-engaging rolling elements each underlying the outer end of a different one of said radial arms for supporting said base;
   c. a plurality of brackets each mounted on a different one of said radial arms for movements longitudinally thereof and each having a transverse opening therethrough upwardly of said base;

d. an elongated flexible tie member extending through said transverse openings and being disposed to embrace an article mounted on said base;

e. and means on the tie element for tightening the tie element snugly about said article.

2. The dolly construction defined in claim 1 in which said base comprises a pair of elongated bars normally disposed at right angles to each other and secured to each other at their longitudinally central portions to provide said radial arms, said brackets having lower end portions defining openings through which said bars extend.

* * * * *